US011929651B2

(12) United States Patent
Ikeya et al.

(10) Patent No.: US 11,929,651 B2
(45) Date of Patent: Mar. 12, 2024

(54) INVERTER INTEGRATED GAS SUPPLY DEVICE

(71) Applicant: IHI Corporation, Tokyo (JP)

(72) Inventors: Nobuyuki Ikeya, Tokyo (JP); Yuji Sasaki, Tokyo (JP); Masaya Taniguchi, Tokyo (JP); Gen Kuwata, Tokyo (JP); Satoru Ohashi, Tokyo (JP)

(*) Notice: Subject to any disclaimer, the term of this patent is extended or adjusted under 35 U.S.C. 154(b) by 279 days.

(21) Appl. No.: 17/481,312

(22) Filed: Sep. 22, 2021

(65) Prior Publication Data

US 2022/0006366 A1 Jan. 6, 2022

Related U.S. Application Data

(63) Continuation of application No. PCT/JP2020/011852, filed on Mar. 17, 2020.

(30) Foreign Application Priority Data

Mar. 27, 2019 (JP) ................. 2019-059958

(51) Int. Cl.
*H02K 11/33* (2016.01)
*F04D 13/06* (2006.01)
(Continued)

(52) U.S. Cl.
CPC ............. *H02K 11/33* (2016.01); *H02K 5/203* (2021.01); *H02K 5/225* (2013.01); *H02K 7/14* (2013.01);
(Continued)

(58) Field of Classification Search
CPC .......... H02K 5/203; H02K 7/14; H02K 11/33; H02K 5/225; F04D 25/06; F04D 17/10;
(Continued)

(56) References Cited

U.S. PATENT DOCUMENTS 6,155,857 A  12/2000 Kato et al.
2012/0015546 A1  1/2012 Yamaguchi et al.
(Continued)

FOREIGN PATENT DOCUMENTS

CN  102449858  5/2012
JP  H6-257695  9/1994
(Continued)

OTHER PUBLICATIONS

International Preliminary Report on Patentability with Written Opinion dated Oct. 7, 2021 for PCT/JP2020/011851.
(Continued)

*Primary Examiner* — Said Bouziane
(74) *Attorney, Agent, or Firm* — SOEI PATENT & LAW FIRM

(57) ABSTRACT

An inverter integrated gas supply device includes a fluid machine configured to discharge air, an electric motor having a motor casing and configured to drive the fluid machine, an inverter having an inverter casing and configured to supply a drive current to the electric motor, a motor-side connection part attached to the motor casing and configured to receive the drive current, and an inverter-side connection part attached to the inverter casing, connected to the motor-side connection part. The motor-side connection part includes a motor-side connector housing, and a motor connector. The inverter-side connection part includes an inverter-side connector housing, and an inverter connector. A position of the motor connector relative to the motor-side connector housing is fixed; and a position of the inverter connector relative to the inverter-side connector housing is variable.

20 Claims, 6 Drawing Sheets

(51) Int. Cl.
  *F04D 29/42* (2006.01)
  *H02K 5/20* (2006.01)
  *H02K 5/22* (2006.01)
  *H02K 7/14* (2006.01)
  *H02P 27/06* (2006.01)

(52) U.S. Cl.
  CPC .............. *H02P 27/06* (2013.01); *F04D 13/06* (2013.01); *F04D 29/4206* (2013.01)

(58) Field of Classification Search
  CPC ........ F04D 25/04; F04D 25/068; F04D 13/06; F04D 29/4206; F02B 39/00; F02B 39/10; H01R 13/631; H02M 7/48; H02P 27/06
  See application file for complete search history.

(56) References Cited

U.S. PATENT DOCUMENTS

| | | | |
|---|---|---|---|
| 2012/0040553 A1* | 2/2012 | Tashiro | .............. H01R 13/6315 439/660 |
| 2014/0199894 A1 | 7/2014 | Kusamaki et al. | |
| 2018/0358748 A1 | 12/2018 | Yamanashi et al. | |
| 2019/0120125 A1 | 4/2019 | Iizuka et al. | |
| 2019/0345956 A1 | 11/2019 | Iizuka et al. | |

FOREIGN PATENT DOCUMENTS

| | | | | |
|---|---|---|---|---|
| JP | H8-065945 | 3/1996 | | |
| JP | H9-245887 | 9/1997 | | |
| JP | 2005-020881 | 1/2005 | | |
| JP | 2005-333748 | 12/2005 | | |
| JP | 2008-082279 | 4/2008 | | |
| JP | 2011-009092 | 1/2011 | | |
| JP | 2011-034825 | 2/2011 | | |
| JP | 2012-005175 | 1/2012 | | |
| JP | 2014-138446 | 7/2014 | | |
| JP | 2015-115969 | 6/2015 | | |
| JP | 2015-183668 | 10/2015 | | |
| JP | 2016-024928 | 2/2016 | | |
| JP | 2016-092933 | 5/2016 | | |
| JP | 2017-223151 | 12/2017 | | |
| JP | 2019-003743 | 1/2019 | | |
| WO | 2011/016272 | 2/2011 | | |
| WO | 2018/012104 | 1/2018 | | |
| WO | WO-2018012104 A1 * | 1/2018 | .............. F02B 33/40 | |
| WO | 2018/139497 | 8/2018 | | |

OTHER PUBLICATIONS

International Preliminary Report on Patentability with Written Opinion dated Oct. 7, 2021 for PCT/JP2020/011852.

International Search Report dated Jun. 9, 2020 for PCT/JP2020/011851.

International Search Report dated Jun. 9, 2020 for PCT/JP2020/011852.

Soei Patent and Law Firm, Statement of Related Matters, dated Sep. 30, 2021.

* cited by examiner

INVERTER INTEGRATED GAS SUPPLY DEVICE

CROSS-REFERENCE TO RELATED APPLICATIONS

This application is a continuation application of PCT Application No. PCT/JP2020/011852, filed on Mar. 17, 2020, which claims the benefit of priority from Japanese Patent Application No. 2019-059958, filed on Mar. 27, 2019, the entire contents of which are incorporated herein by reference.

BACKGROUND

Japanese Unexamined Patent Publications No. 2005-20881, H08-65945, and 2016-92933 disclose a device having an electric motor and an inverter. Japanese Unexamined Patent Publication No. 2005-20881 discloses a cooling structure. The cooling structure of Japanese Unexamined Patent Publication No. 2005-20881 cools the electric motor and the inverter. Japanese Unexamined Patent Publication No. H08-65945 discloses a device that eliminates the pressure difference between the inside and outside of a motor case. The device of Japanese Unexamined Patent Publication No. H08-65945 also prevents the intrusion of water into the interior of the motor case. Japanese Unexamined Patent Publication No. 2016-92933 discloses a configuration that removably connects an inverter housing part to a motor housing part.

SUMMARY

An example inverter integrated gas supply device includes an electric motor having a motor casing and driving a fluid machine that discharges air, an inverter having an inverter casing and supplying a drive current for controlling the number of rotations of the electric motor to the electric motor, a motor-side connection part attached to the motor casing and receiving the drive current, and an inverter-side connection part attached to the inverter casing, connected to the motor-side connection part, and supplying the drive current to the motor-side connection part. The motor-side connection part includes a motor-side connector housing fixed to the motor casing, and a motor connector disposed inside the motor-side connector housing and configured to receive the drive current from the inverter-side connection part. The inverter-side connection part includes an inverter-side connector housing fixed to the inverter casing, and an inverter connector disposed inside the inverter-side connector housing and configured to supply the drive current to the motor connector. A position of the motor connector relative to the motor-side connector housing is fixed. A position of the inverter connector relative to the inverter-side connector housing is variable.

DETAILED DESCRIPTION

Figure 1:
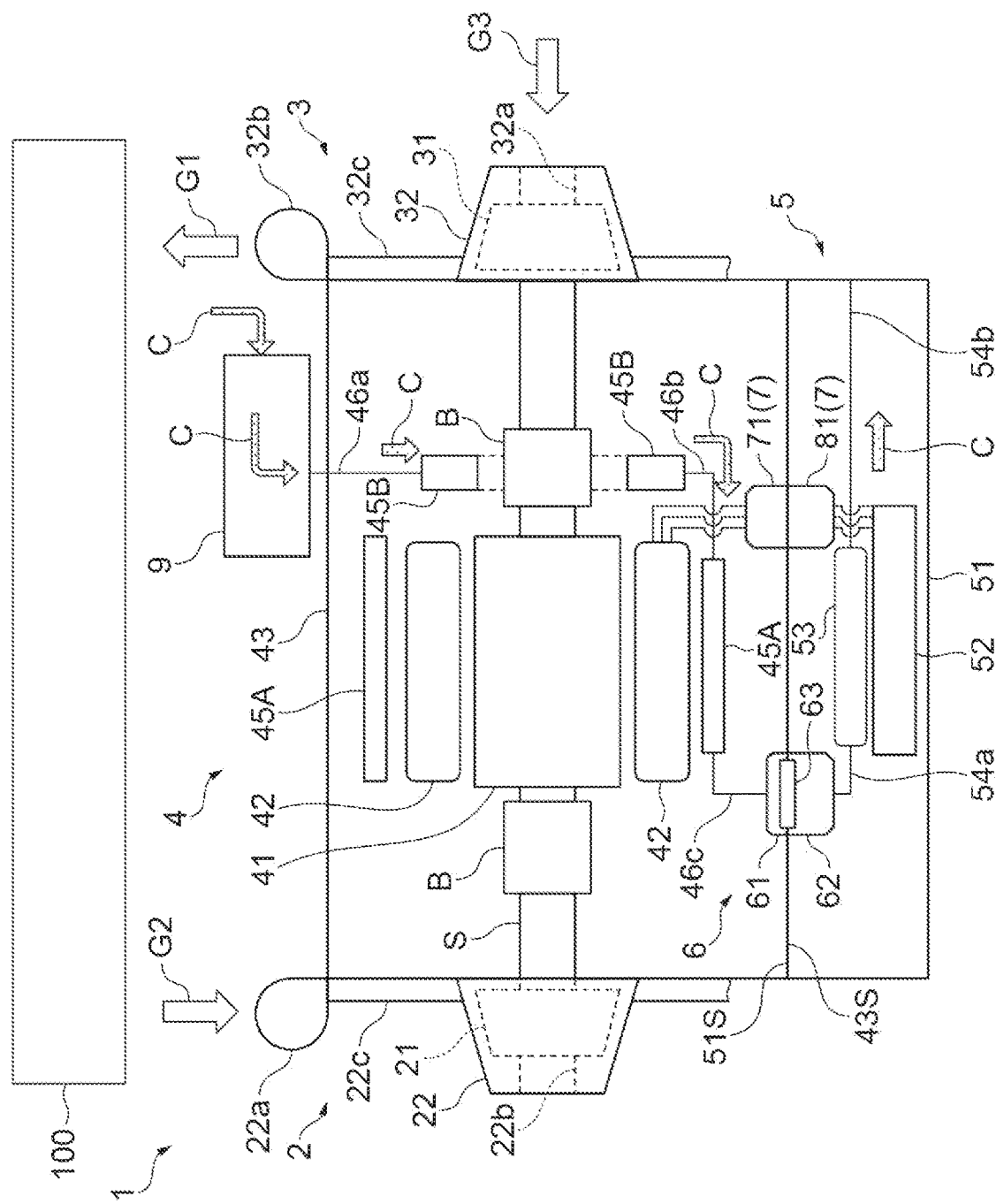
FIG. 1 is a diagram illustrating an example electric turbocharger.

An example inverter integrated gas supply device includes an electric motor having a motor casing and driving a fluid machine that discharges air, an inverter having an inverter casing and supplying a drive current for controlling the number of rotations of the electric motor to the electric motor, a motor-side connection part attached to the motor casing and receiving the drive current, and an inverter-side connection part attached to the inverter casing, connected to the motor-side connection part, and supplying the drive current to the motor-side connection part. The motor-side connection part includes a motor-side connector housing fixed to the motor casing, and a motor connector disposed inside the motor-side connector housing and configured to receive the drive current from the inverter-side connection part. The inverter-side connection part includes an inverter-side connector housing fixed to the inverter casing, and an inverter connector disposed inside the inverter-side connector housing and configured to supply the drive current to the motor connector. A position of the motor connector relative to the motor-side connector housing is fixed. A position of the inverter connector relative to the inverter-side connector housing is variable.

The relative position of the inverter connector may be variable. As a result, the inverter connector is movable relative to the inverter-side connector housing according to the position of the motor connector. Thus, the allowable misalignment of the inverter connector relative to the motor connector with the inverter casing fixed to the motor casing can be increased. As a result, the workability of attaching the inverter casing to the motor casing is improved. Assembly is thus facilitated.

In some examples, a motor main surface of the motor casing may include a motor electric connection surface to which the motor-side connection part is attached, and a motor flow channel connection surface having a motor flow channel port forming a flow channel of cooling water. An inverter main surface of the inverter casing may include an inverter electric connection surface to which the inverter-side connection part is attached, the inverter electric connection surface facing the motor electric connection surface, and an inverter flow channel connection surface having an inverter flow channel port coupled to the motor flow channel port and facing the motor flow channel connection surface. The motor electric connection surface may differ in position from the motor flow channel connection surface in a facing direction in which the motor main surface and the inverter main surface face each other. The inverter electric connection surface may differ in position from the inverter flow channel connection surface in the facing direction. A portion that forms an electrical connection may be composed of the motor-side connection part and the inverter-side connection part. A portion that forms a connection to form the flow channel of cooling water may be composed of the motor flow channel port and the inverter flow channel port. The portion that forms the electrical connection is formed in a position different from the position of the portion that forms the connection to form the flow channel of cooling water in the facing direction. A step is thus formed between the portion that forms the connection to form the flow channel of cooling water and the portion that forms the electrical connection. This step is capable of preventing the movement of cooling water and the like between the portion that forms the connection to form the flow channel of cooling water and the portion that forms the electrical connection. The electrical connection can thus be satisfactorily ensured.

In some examples, the motor electric connection surface may include a first motor depressing surface depressing a first sealing member disposed so as to surround the motor-side connection part, a first motor surrounding surface surrounding the first motor depressing surface, and a first motor step surface connecting the first motor depressing surface to the first motor surrounding surface. The inverter electric connection surface may include a first inverter depressing surface depressing the first sealing member, a first inverter surrounding surface surrounding the first inverter depressing surface, and a first inverter step surface connecting the first inverter depressing surface to the first inverter surrounding surface. The first motor step surface and the first inverter step surface may be configured to prevent the intrusion of water and the like from outside. The electrical connection can thus be more satisfactorily ensured.

In some examples, the motor flow channel connection surface may include a second motor depressing surface depressing a second sealing member disposed so as to surround the motor flow channel port, a second motor surrounding surface surrounding the second motor depressing surface, and a second motor step surface connecting the second motor depressing surface to the second motor surrounding surface. The inverter flow channel connection surface may include a second inverter depressing surface depressing the second sealing member, a second inverter surrounding surface surrounding the second inverter depressing surface, and a second inverter step surface connecting the second inverter depressing surface to the second inverter surrounding surface. The second motor step surface and the second inverter step surface may be configured to prevent the intrusion of water and the like from outside. The electrical connection can thus be more satisfactorily ensured.

In some examples, the motor main surface may further include a motor coupling surface having a coupling part configured to couple the motor casing to the inverter casing, and a third motor step surface configured to couple the motor coupling surface to at least one of the motor electric connection surface and the motor flow channel connection surface. The inverter main surface may further include an inverter coupling surface facing the motor coupling surface, and a third inverter step surface configured to couple the inverter coupling surface to at least one of the inverter electric connection surface and the inverter flow channel connection surface. The first motor step surface may abut the first inverter step surface. The third motor step surface may abut the third inverter step surface. The first motor step surface may face a direction different from a direction in which the third motor step surface faces. Accordingly, the inverter case can be accurately aligned with the motor case.

In some examples, a groove may be formed in at least one of a region of the motor main surface sandwiched between the motor electric connection surface and the motor flow channel connection surface, and a region of the inverter main surface sandwiched between the inverter electric connection surface and the inverter flow channel connection surface. Liquid such as cooling water that has seeped in between the motor main surface and the inverter main surface may be externally discharged via the groove.

In some examples, the inverter-side connection part may further include a socket and a fastening member. The inverter-side connector housing may include a through hole through which the socket and the fastening member are inserted. The fastening member may be inserted through the socket. The fastening member may be pressed against one end surface of the socket. Another end surface of the socket may be pressed against the inverter casing. A gap may be formed between a circumferential surface of the socket and the through hole. Accordingly, a structure in which the relative position of the inverter connector is variable can be simplified. As a result, the workability of attaching the inverter casing to the motor casing is improved. Assembly is thus further facilitated.

Hereinafter, with reference to the drawings, the same elements or similar elements having the same function are denoted by the same reference numerals, and redundant description will be omitted.

An example electric turbocharger 1 (inverter integrated gas supply device) illustrated in FIG. 1 will be described. The electric turbocharger 1 may be a centrifugal compressor that is applied, for example, to a fuel cell system 100. The fuel cell system 100 may be, for example, a polymer electrolyte fuel cell (PEFC) system, a phosphoric acid fuel cell (PAFC) system, or other types of fuel cell systems and the like.

The electric turbocharger 1 has a turbine 2 (fluid machine), a compressor 3 (fluid machine), an electric motor 4, and an inverter 5. The turbine 2, compressor 3, and electric motor 4 are connected to one another by a rotating shaft S. The turbine 2 is mounted on a first end of the rotating shaft S. The compressor 3 is mounted on a second end of the rotating shaft S. The electric motor 4 is provided between the turbine 2 and the compressor 3.

Air G1 is gas compressed by the compressor 3. The air G1 is supplied to the fuel cell system 100 connected to the electric turbocharger 1. The fuel cell system 100 causes a chemical reaction between fuel and an oxidizing agent. This chemical reaction generates air G2 containing water vapor and electricity. The fuel cell system 100 supplies the air G2 to the turbine 2.

The fuel cell system 100 discharges the air G2 having a high temperature. The electric turbocharger 1 drives the turbine 2 using the air G2. The driving of the turbine 2 causes the compressor 3 to be driven. The compressor 3 supplies the air G1 to the fuel cell system 100. In some examples, a large majority of the driving force of the compressor 3 may be supplied by the electric motor 4. That is, the electric turbocharger 1 may be driven mostly by the electric motor.

The fuel cell system 100 and the electric turbocharger 1 are mounted, for example, on a vehicle such as an electric vehicle. In some examples, electric power output from the fuel cell system 100 may be supplied to the electric motor 4 of the electric turbocharger 1. Alternatively, electric power may be supplied to the electric motor 4 of the electric turbocharger 1 by a power supply other than the fuel cell system 100.

The electric turbocharger 1 will be described in further detail below.

The turbine 2 has a turbine impeller 21 and a turbine housing 22. The turbine impeller 21 is mounted on the first end of the rotating shaft S. The compressor 3 has a compressor impeller 31 and a compressor housing 32. The compressor impeller 31 is mounted on the second end of the rotating shaft S. In some examples, a nozzle may be disposed on the turbine 2 side, and a diffuser may be disposed on the compressor 3 side.

A motor case 43 (motor casing) is provided between the turbine housing 22 and the compressor housing 32. The rotating shaft S is rotatably supported by the motor case 43 via bearings B.

The turbine housing 22 has an inlet part 22a and a discharge part 22b. The fuel cell system 100 discharges the air G2 containing water vapor. The air G2 flows into the turbine housing 22 from the inlet part 22a. The air G2 flown in passes through a flow channel 22c, and is then supplied to the turbine impeller 21. The turbine impeller 21 is, for example, a radial turbine. The turbine impeller 21 converts the fluid energy of the supplied air G2 into rotational energy. The air G2 is then discharged from the discharge part 22b.

The compressor housing 32 has an inlet part 32a and a discharge part 32b. When the turbine impeller 21 rotates, the rotating shaft S and the compressor impeller 31 rotate. The rotating compressor impeller 31 draws in air G3 from the inlet part 32a. The compressor impeller 31 compresses the air G3. The compressor impeller 31 then discharges the compressed air G1. The air G1 passes through a flow channel 32c, and is then discharged from the discharge part 32b. The air G1 discharged from the discharge part 32b is supplied to the fuel cell system 100. In some examples, the gas to be compressed by the compressor 3 is not limited to air.

The electric motor 4 is, for example, a brushless AC motor. The electric motor 4 has a rotor 41 which is a rotating component and a stator 42 which is a stationary component. The rotor 41 includes one or a plurality of magnets. The rotor 41 fixed to the rotating shaft S is rotatable about an axis together with the rotating shaft S. The rotor 41 is disposed in an axial center portion of the rotating shaft S. The "center portion" refers to a generally central position in the axis direction. In other words, it is not center in the strict sense. For example, the rotor 41 may be disposed closer to the turbine 2. Alternatively, the rotor 41 may be disposed closer to the compressor 3. The stator 42 has a plurality of coils and an iron core. The stator 42 surrounds the rotor 41 in a circumferential direction of the rotating shaft S. The stator 42 generates a magnetic field around the rotating shaft S. The stator 42 causes the rotor 41 to rotate in cooperation with the rotor 41.

The inverter 5 supplies a drive current for controlling the number of rotations of the electric motor 4 to the electric motor 4. The inverter 5 has an inverter case 51 (inverter casing) and an inverter circuit 52.

The electric turbocharger 1 has a cooling system. The cooling system is for the electric motor 4 and the inverter 5. The electric turbocharger 1 has a heat exchanger 9. In some examples, the heat exchanger 9 may be omitted from the electric turbocharger 1 depending on the mode of use. The electric motor 4 has flow channels 46a, 46b, 46c, and cooling parts 45A, 45B. The cooling part 45A cools the stator 42. The cooling part 45B cools the bearing B. The flow channel 46a is connected to the heat exchanger 9. The flow channel 46a receives cooling water C from the heat exchanger 9. The flow channel 46a then supplies the cooling water C to the cooling part 45B. The flow channel 46b connects the cooling part 45A to the cooling part 47. The flow channel 46b receives the cooling water C that flows out from the cooling part 45B. The flow channel 46b supplies the received cooling water C to the cooling part 45A. The flow channel 46c connects the cooling part 45A to a cooling water connection structure 6 described later. The flow channel 46c receives the cooling water C flowing out from the cooling part 45A. The flow channel 46c supplies the received cooling water C to the cooling water connection structure 6.

The inverter 5 has a cooling part 53 and flow channels 54a, 54b. The cooling part 53 cools the inverter circuit 52. The flow channel 54a connects the cooling water connection structure 6 to the cooling part 53. The flow channel 54a receives the cooling water C that flows out from the cooling water connection structure 6. The flow channel 54a supplies the received cooling water C to the cooling part 53. The flow channel 54b is connected to the cooling part 53. The flow channel 54b receives the cooling water C that flows out from the cooling part 53. The flow channel 54b discharges the received cooling water C outside the inverter case 51.

The connection configuration between the electric motor 4 and the inverter 5 will be described in further detail below.

The inverter case 51 is fixed to the motor case 43 by a stud bolt or the like. The electric turbocharger 1 has the cooling water connection structure 6 and an electric connection structure 7. The cooling water connection structure 6 supplies and receives the cooling water C which is a coolant. The electric connection structure 7 supplies and receives the drive current. These connection structures do not use connection members such as pipes or wires to connect the inverter 5 to the electric motor 4. That is, the cooling water connection structure 6 and the electric connection structure 7 are formed by attaching the inverter case 51 to the motor case 43.

<Cooling Water Connection Structure>

The cooling water connection structure 6 has an interface part 61. The interface part 61 is formed on a connection surface 43S (motor main surface) of the motor case 43. The interface part 61 is flat. The interface part 61 projects slightly from a surrounding flat surface. The interface part 61 has an opening which is an end of the flow channel 46c formed therein. Thus, the cooling water C that has flown through the interior of the electric motor 4 is discharged from the opening.

The cooling water connection structure 6 has an interface part 62. The interface part 62 is formed on a connection surface 51S (inverter main surface) of the inverter case 51. The interface part 62 is flat. The interface part 62 is recessed slightly from the connection surface 51S. The interface part 62 has an opening which is an end of the flow channel 54a formed therein.

The cooling water connection structure 6 has a packing 63 (packing material). The packing 63 is sandwiched between the interface part 61 and the interface part 62. The packing 63 surrounds the opening of the flow channel 54a. The packing 63 is disposed in a groove formed in the interface part 62.

When the inverter case 51 is attached to the motor case 43, the interface part 62 of the inverter case 51 fits into the interface part 61 of the motor case 43. The interface part 61 compresses the packing 63 slightly. As a result, watertightness between the interface parts 61, 62 is ensured by the compressed packing 63. Accordingly, the cooling water C can be supplied and received between the electric motor 4 and the inverter 5. Such a connection structure can connect the inverter case 51 to the motor case 43 without the need of connection components such as pipes in order to facilitate an attachment of the inverter 5 to the electric motor 4. By omitting connection components, the manufacturing cost of the electric turbocharger 1 can also be reduced.

<Electric Connection Structure>

Figure 2:
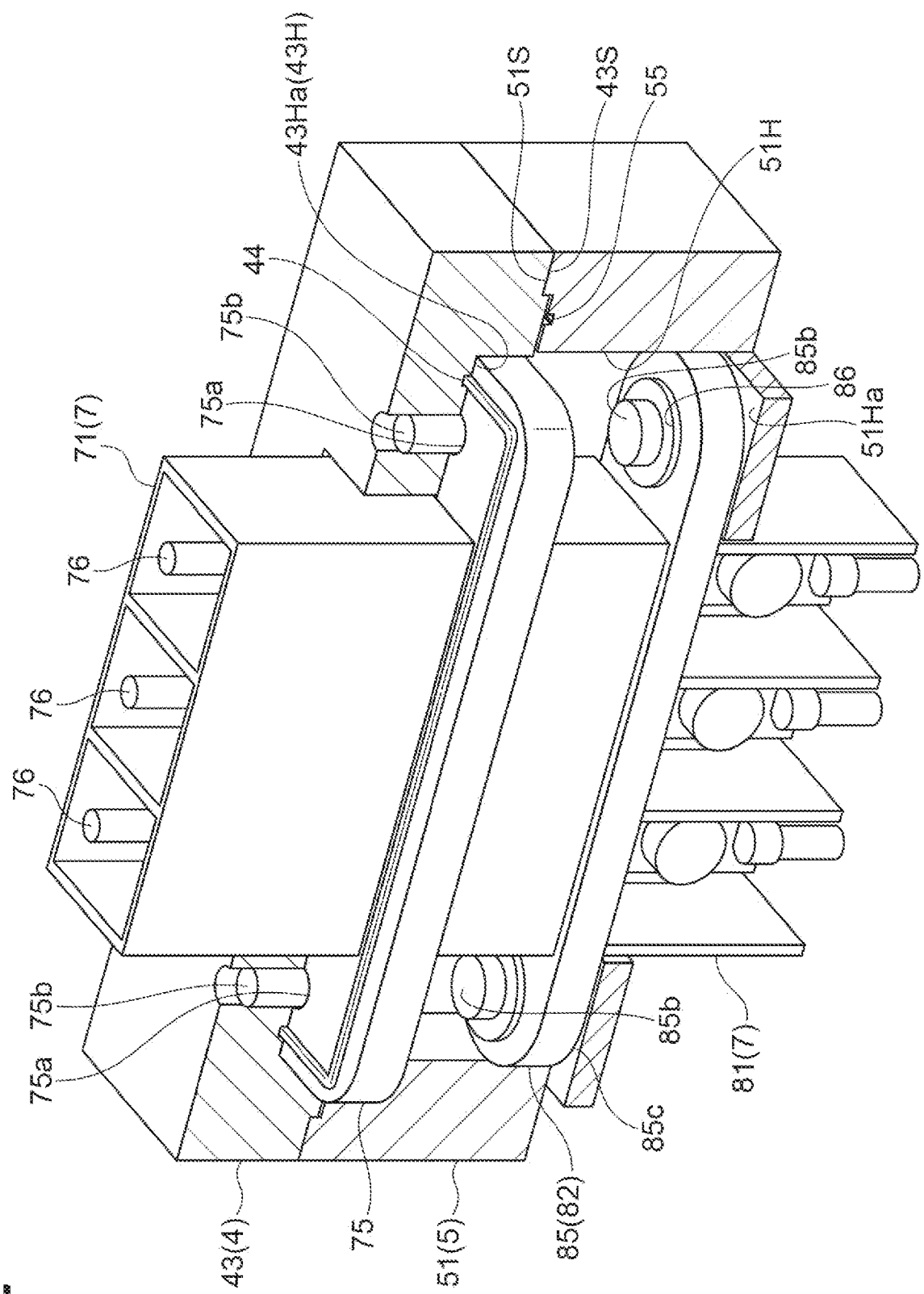
FIG. 2 is a perspective view illustrating an example structure for ensuring electrical connection.

As shown in FIG. 2, the electric connection structure 7 has a motor-side connection part 71 and an inverter-side connection part 81. The motor side connection part 71 is fixed to the motor case 43. Similarly, the inverter-side connection part 81 is fixed to the inverter case 51. The inverter 5 is electrically connected to the electric motor 4 by inserting the inverter-side connection part 81 into the motor-side connection part 71. This structure ensures the connection between the motor-side connection part 71 and the inverter-side connection part 81 by the motor case 43 and the inverter case 51 being connected to each other. The inverter case 51 can be connected to the motor case 43 without the need of connection components such as cables in order to facilitate the attachment of the inverter 5 to the electric motor 4. By omitting connection components, the manufacturing cost of the electric turbocharger 1 can be further reduced.

Figure 3:
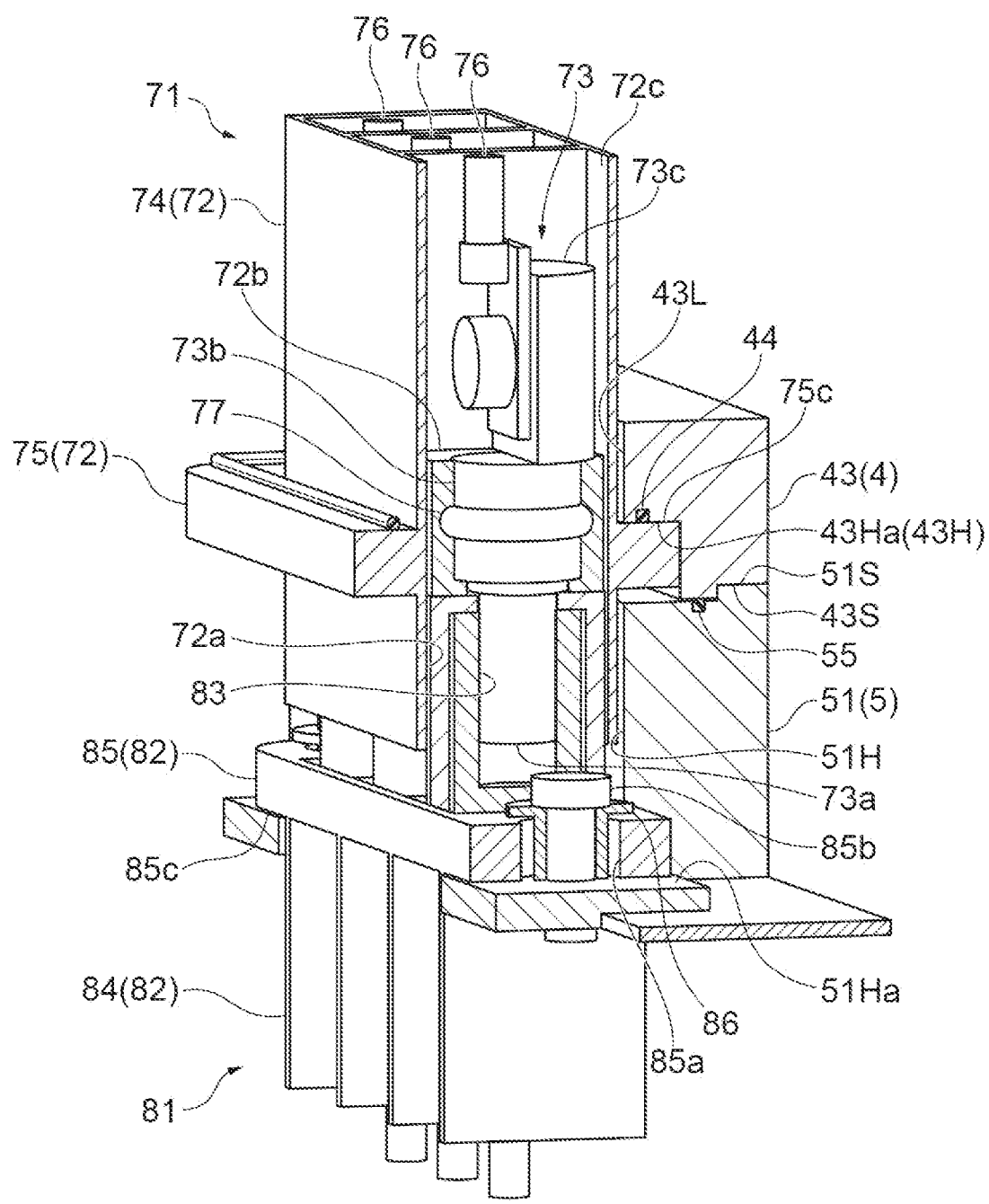
FIG. 3 is a perspective cross-sectional view illustrating the inside of the structure of FIG. 2.

As shown in FIG. 3, the motor-side connection part 71 has a pin housing 72 (motor-side connector housing) and a plurality of pins 73 (motor connectors). The pin housing 72 has a body 74 and a flange 75. The body 74 houses the plurality of pins 73. In some examples, the number of the pins 73 may be selected as appropriate according to the specification. FIG. 3 illustrates a configuration having three pins 73 as an example. The flange 75 has a pair of bolt holes 75a (see FIG. 2). The pin housing 72 is fixed to the motor case 43 by bolts 75b inserted through the bolt holes 75a. Each pin 73 has a pin distal end 73a, a large diameter part 73b, and a cable connection end 73c. The pin distal end 73a, the large diameter part 73b, and the cable connection end 73c may be integrally molded using a conductive metal material.

The pin housing 72 includes a distal end part 72a closer to the inverter 5, an intermediate part 72b, and a base end part 72c closer to the electric motor 4. The inverter-side connection part 81 is inserted into the distal end part 72a. Cables 76 connected to the pins 73 extend from the base end part 72c. The distal end part 72a is hollow. The intermediate part 72b is solid. The intermediate part 72b holds the pins 73. The intermediate part 72b separates the distal end part 72a from the base end part 72c. The cable connection end 73c is disposed in the base end part 72c. The space in which the cable connection end 73c is disposed is filled with a resin material or the like. That is, the base end part 72c is also solid. The illustration of the component that fills the base end part 72c is omitted in FIG. 3.

The pin distal end 73a is inserted into a receptacle 83 of the inverter-side connection part 81 described later. The pin distal end 73a is electrically connected to the receptacle 83. The large diameter part 73b has an outer diameter that is larger than the outer diameter of the pin distal end 73a. A loop-shaped packing 77 is mounted on the large diameter part 73b. The packing 77 is pushed against an inner wall surface of a hole formed in the intermediate part 72b. The packing 77 is compressed as a result. This inhibits movement of gas and liquid between the distal end part 72a and the base end part 72c. That is, the distal end part 72a and the base end part 72c do not communicate with each other. The configuration illustrated in FIG. 3 may be referred to as a first watertight structure of the electric turbocharger 1.

The pin 73 is attached to the pin housing 72 via the packing 77. The packing 77 is formed of an elastic resin material. The relative positional relationship between the pin 73 and the pin housing 72 can thus vary depending on the elasticity of the packing 77. That is, the pin 73 is attached to the pin housing 72 with a certain amount of flexibility. This allows small relative changes between the pin 73 and the pin housing 72 by the elasticity of the packing 77 when a force that causes the relative changes is applied, for example, by vibrations acting on the electric turbocharger 1. Thus, unintended stress on the pin 73 and the pin housing 72 caused by vibrations acting on the electric turbocharger 1 or vibrations generated by the electric turbocharger 1 can be suppressed.

The inverter-side connection part 81 is inserted into a distal end of the pin housing 72. The inverter-side connection part 81 has a receptacle housing 82 (inverter-side connector housing) and three receptacles 83 (inverter connector). The receptacles 83 receive the pins 73 of the motor-side connection part 71. The receptacle housing 82 has a body 84 and a flange 85. The body 84 houses the three receptacles 83. The flange 85 has a pair of through holes 85a (through holes). The receptacle housing 82 is fixed to the inverter case 51 by bolts 85b (fastening members) inserted through the through holes 85a. The inverter case 51 has a hole 51H (see FIG. 2) formed in the connection surface 51S. The shape of the hole 51H corresponds to the shape of the flange 85. For example, the shape of the hole 51H is the shape of the flange 85 that takes into consideration the amount of movement of sockets 86. A rear surface 85c of the flange 85 contacts a bottom surface 51Ha of the hole 51H.

In some examples, the connection part formed in the inverter case 51 is directly connected to the connection part formed in the motor case 43. In other words, the electric turbocharger 1 above does not have any cables extending between the motor case 43 and the inverter case 51. As a result, the operation of connecting cables to the connection parts may be omitted. Assembly is thus facilitated. The number of components is also reduced by omitting the usage of cables. The manufacturing cost can thus also be reduced. Moreover, cables which may be a source of electromagnetic noise are eliminated. Electromagnetic noise is reduced as a result. Consequently, measures against noise may also be omitted or can be simplified.

The position of the receptacle housing 82 relative to the inverter case 51 is variable. In other words, the receptacle housing 82 is allowed to move slightly on the bottom surface 51Ha. When the inverter case 51 is attached to the motor case 43, the positions of the receptacles 83 of the inverter-side connection part 81 may not precisely match the positions of the pin distal ends 73a of the motor-side connection part 71. In such a case, the pin distal ends 73a may biasingly contact inner circumferential surfaces of the receptacles 83. If the misalignment is large, the pin distal ends 73a may not be able to be inserted into the receptacles 83. Thus, to allow for this misalignment, the receptacle housing 82 holding the receptacles 83 has a configuration to be movable relative to the inverter case 51.

Figure 4:
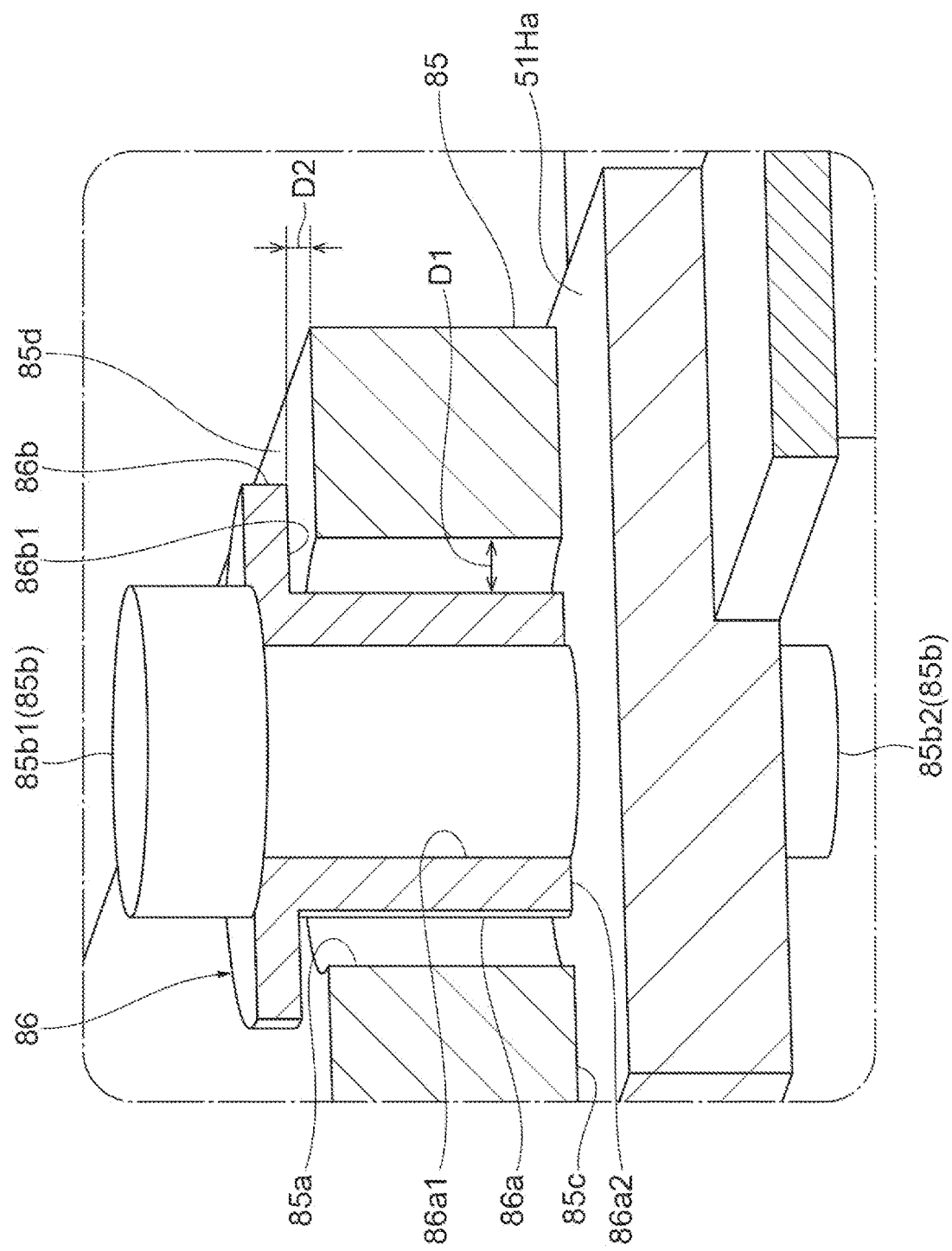
FIG. 4 is an enlarged perspective view illustrating an attachment structure of a receptacle housing of an inverter-side connection part in the structure of FIG. 2.

FIG. 4 illustrates an example structure. The socket 86 is inserted into the through hole 85a of the flange 85. The socket 86 has a cylindrical body 86a and a disk-shaped flange 86b. The flange 86b is formed on an upper end of the body 86a. The body 86a has an outer diameter that is smaller than an inner diameter of the through hole 85a. Accordingly, a gap D1 is formed between an outer circumferential surface of the body 86a and an inner circumferential surface of the through hole 85a. A hole 86a1 of the body 86a may have an inner diameter that is the same as an outer diameter of a shaft part 85b2 of the bolt 85b. Alternatively, the hole 86a1 of the body 86a may have an inner diameter that is slightly larger than the outer diameter of the shaft part 85b2 of the bolt 85b. A lower end 86a2 of the body 86a abuts against the bottom surface 51Ha of the inverter case 51. The bolt 85b is inserted into the hole 86a1 of the body 86a. The bolt 85b is then screwed into a screw hole formed in the bottom surface 51Ha. As a result, the socket 86 is fixed to the inverter case 51. The upper end of the body 86a is separated from a main surface 85d of the flange 85. A gap D2 is thus also formed between a rear surface 86b1 of the socket 86 formed on the upper end and the main surface 85d of the flange 85 of the receptacle housing 82. The receptacle housing 82 is allowed to move along the bottom surface 51Ha due to the gaps D1, D2. The distance through which the receptacle housing 82 is allowed to move depends on the length of the gap D1.

Figure 5:
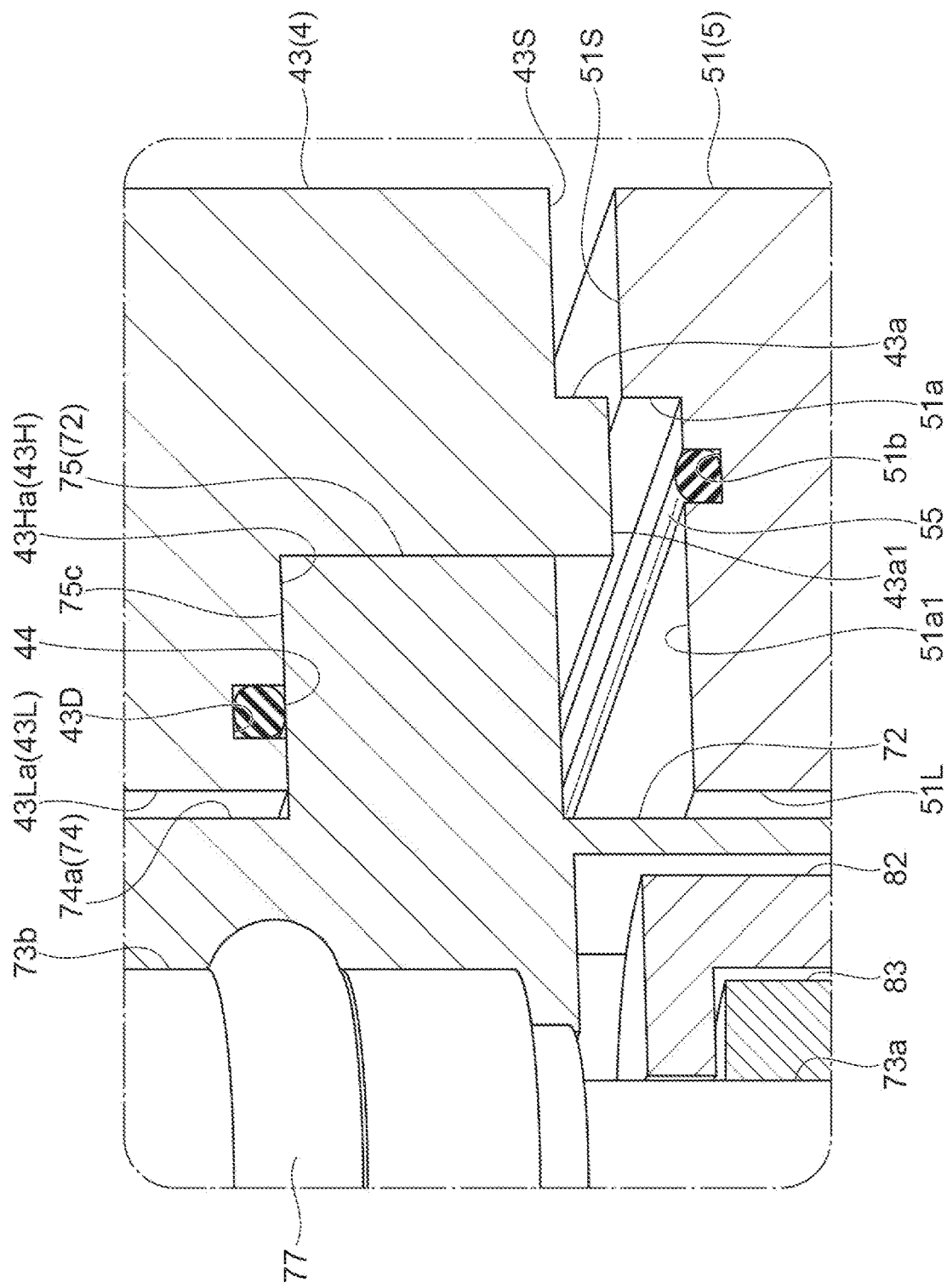
FIG. 5 is an enlarged perspective view illustrating an example watertight structure.

As described above, the electric turbocharger 1 has the first watertight structure due to the packing 77. The electric turbocharger 1 may also have a second watertight structure and a third watertight structure shown in FIG. 5. For ease of understanding, FIG. 5 illustrates the inverter case 51 slightly separated from the motor case 43.

The second watertight structure ensures watertightness between the motor case 43 and the pin housing 72. The motor case 43 has a hole 43H in the connection surface 43S. The hole 43H corresponds to the shape of the flange 75. A groove 43D is formed in a bottom surface 43Ha of the hole 43H. The groove 43D surrounds a hole 43L. A packing 44 (second sealing member) is disposed in the groove 43D. A main surface 75c of the flange 75 faces the bottom surface 43Ha of the hole 43H. When the flange 75 is fitted into the hole 43H, the main surface 75c of the flange 75 compresses the packing 44. The second watertight structure inhibits the movement of gas and liquid through a gap between a side surface 74a of the body 74 of the pin housing 72 and an inner wall surface 43La of the hole 43L formed in the motor case 43. The second watertight structure also inhibits the movement of gas and liquid through between the bottom surface 43Ha of the hole 43H and the main surface 75c of the flange 75.

The third watertight structure ensures watertightness between the motor case 43 and the inverter case 51. The inverter case 51 has a stepped part 51a. The stepped part 51a is formed on the connection surface 51S. A stepped part 43a of the motor case 43 fits into the stepped part 51a to form a so-called spigot type structure (inlay structure). The spigot type structure facilitates the positioning of the inverter-side connection part 81 relative to the motor-side connection part 71. The stepped part 51a has a hole 51L in a bottom surface 51a1. The pin housing 72 and the receptacle housing 82 are inserted through the hole 51L. A groove 51b is formed in the bottom surface 51a1. The groove 51b surrounds the hole 51L. A loop-shaped packing 55 (first sealing member) is disposed in the groove 51b. When the stepped parts 43a, 51a are fitted into one another, a bottom surface 43a1 of the stepped part 43a compresses the packing 55. Watertightness between the motor case 43 and the inverter case 51 is ensured by the compressed packing 55.

<Coupling Surface Structure>

Figure 6A:
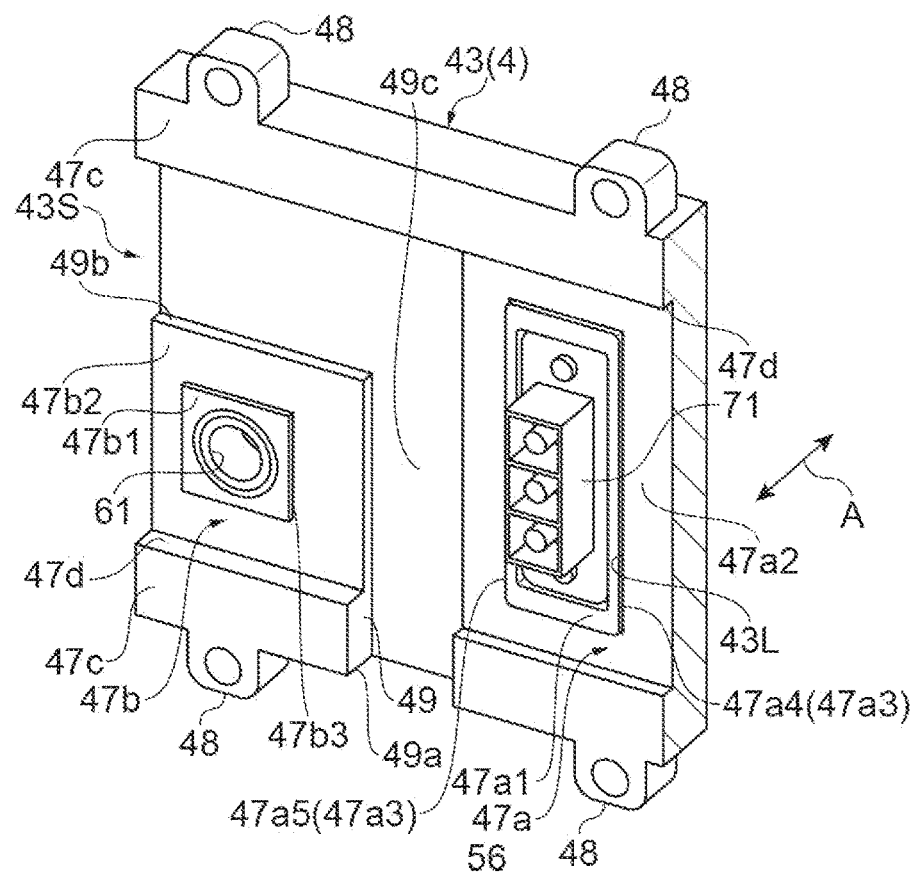
FIG. 6A is a perspective view illustrating a connection surface of a motor case and FIG. 6B is a perspective view illustrating a connection surface of an inverter case.

As shown in FIG. 6A, the connection surface 43S of the motor case 43 has a motor electric connection surface 47a, a motor flow channel connection surface 47b, a motor coupling surface 47c, a motor step surface 47d (third motor step surface) and a groove bottom surface 49c.

The motor-side connection part 71 is attached to the motor electric connection surface 47a. For example, the motor electric connection surface 47a has a motor depressing surface 47a1 (first motor depressing surface), a motor surrounding surface 47a2 (first motor surrounding surface), and a motor step surface 47a3 (first motor step surface, motor standing surface).

The motor depressing surface 47a1 includes the hole 43L. The motor-side connection part 71 is disposed in the hole 43L. The motor depressing surface 47a1 surrounds the motor-side connection part 71. The motor depressing surface 47a1 depresses the packing 55. The motor depressing surface 47a1 forms a watertight structure by cooperating with an inverter depressing surface 57a1 and the packing 55.

The motor surrounding surface 47a2 surrounds the motor depressing surface 47a1. For example, the motor surrounding surface 47a2 may be defined as a surface different from the motor depressing surface 47a1. The motor surrounding surface 47a2 may be defined as including the motor depressing surface 47a1 as a portion thereof.

The motor depressing surface 47a1 is coupled to the motor surrounding surface 47a2 via the motor step surface 47a3. The motor step surface 47a3 extends in a normal direction of the motor surrounding surface 47a2. The motor depressing surface 47a1 is thus parallel to the motor surrounding surface 47a2. A facing direction A is defined. The facing direction A is a direction in which the connection surface 43S of the motor case 43 and the connection surface 51S of the inverter case 51 face each other. The position of the motor surrounding surface 47a2 is different from the position of the motor depressing surface 47a1 in this facing direction A. For example, the motor depressing surface 47a1 projects from the motor surrounding surface 47a2 in the facing direction A toward the inverter case 51 from the motor case 43.

The interface part 61 (motor flow channel port) that forms a flow channel of the cooling water is formed in the motor flow channel connection surface 47b. The position of the motor flow channel connection surface 47b is different from the position of the motor electric connection surface 47a in the facing direction A. For example, the motor electric connection surface 47a projects more than the motor flow channel connection surface 47b in the facing direction A toward the inverter case 51 from the motor case 43. The motor flow channel connection surface 47b has a motor depressing surface 47b1 (second motor depressing surface), a motor surrounding surface 47b2 (second motor surrounding surface), and a motor step surface 47b3 (second motor step surface).

The motor depressing surface 47b1 includes the interface part 61 which is a through hole. The motor depressing surface 47b1 surrounds the interface part 61. The motor depressing surface 47b1 depresses the packing 63 (second sealing member). The motor depressing surface 47b1 forms a watertight structure by cooperating with an inverter depressing surface 57b1 and the packing 63.

The motor depressing surface 47b1 is coupled to the motor surrounding surface 47b2 via the motor step surface 47b3. The motor step surface 47b3 extends in a normal direction of the motor surrounding surface 47b2. The motor depressing surface 47b1 is thus parallel to the motor surrounding surface 47b2. However, the position of the motor surrounding surface 47b2 is different from the position of the motor depressing surface 47b1 in the facing direction A. For example, the motor depressing surface 47b1 projects from the motor surrounding surface 47b2 in the facing direction A toward the inverter case 51 from the motor case 43.

The motor coupling surface 47c includes a coupling part 48. The coupling part 48 is a part for attaching a fastening member. The fastening member fixes the motor case 43 to the inverter case 51. The motor coupling surface 47c does not overlap with the motor electric connection surface 47a or the motor flow channel connection surface 47b. The motor case 43 includes two motor coupling surfaces 47c. The motor coupling surfaces 47c are formed so as to sandwich the motor electric connection surface 47a and the motor flow channel connection surface 47b.

The position of the motor coupling surface 47c is different from the position of the motor electric connection surface 47a in the facing direction A. For example, the motor coupling surface 47c projects from the motor electric connection surface 47a in the facing direction A toward the inverter case 51 from the motor case 43. In such a structure, the motor coupling surface 47c is connected to the motor electric connection surface 47a via the motor step surface 47d.

A drain groove 49 (described in further detail later) is formed between the motor coupling surface 47c at the top of the page and the motor flow channel connection surface 47b. The motor coupling surface 47c is thus not directly coupled to the motor flow channel connection surface 47b. In a case in which the drain groove 49 is not formed, a step surface that couples the motor coupling surface 47c to the motor flow channel connection surface 47b may be formed. The step surface may be flush with (may be the same surface as) the motor step surface 47d. The step surface may be a surface different from the motor step surface 47d.

The drain groove 49 is formed in the connection surface 43S. The drain groove 49 externally discharges liquid (for example, cooling water) that has seeped in between the motor case 43 and the inverter case 51. The drain groove 49 externally discharges water intruding from outside of the motor case 43 of the electric turbocharger 1. Examples of water intruding from the outside includes water splashed from a road surface and water sprayed during cleaning.

The drain groove 49 is the most recessed region of the connection surface 43 S along the facing direction A. The drain groove 49 forms the largest gap between the connection surfaces 43S, 51S when the motor case 43 is combined with the inverter case 51. The drain groove 49 is capable of externally discharging liquid such as the cooling water that has seeped in between the connection surfaces 43S, 51S.

The drain groove 49 is formed between the motor electric connection surface 47a and the motor flow channel connection surface 47b. The drain groove 49 inhibits the movement of the cooling water leaked from the cooling water connection structure 6 to the electric connection structure 7. The drain groove 49 is also formed between the motor flow channel connection surface 47b and the motor coupling surface 47c. While the drain groove 49 is illustrated as being formed between the motor flow channel connection surface 47b and one of the motor coupling surfaces 47c, the drain groove 49 may further be formed between the motor flow channel connection surface 47b and the other motor coupling surface 47c.

The drain groove 49 includes an opening 49a that communicates with the outside of the connection surface 43S. This opening 49a may, for example, be formed vertically downward in an installed attitude of the electric turbocharger 1. The drain groove 49 may further include an opening 49b. The orientation of the opening 49b may be orthogonal to the orientation of the opening 49a.

As discussed above, the drain groove 49 may be formed in the motor case 43. However, in other examples the drain groove may be formed in the inverter case 51.

<Inverter>

Figure 6B:
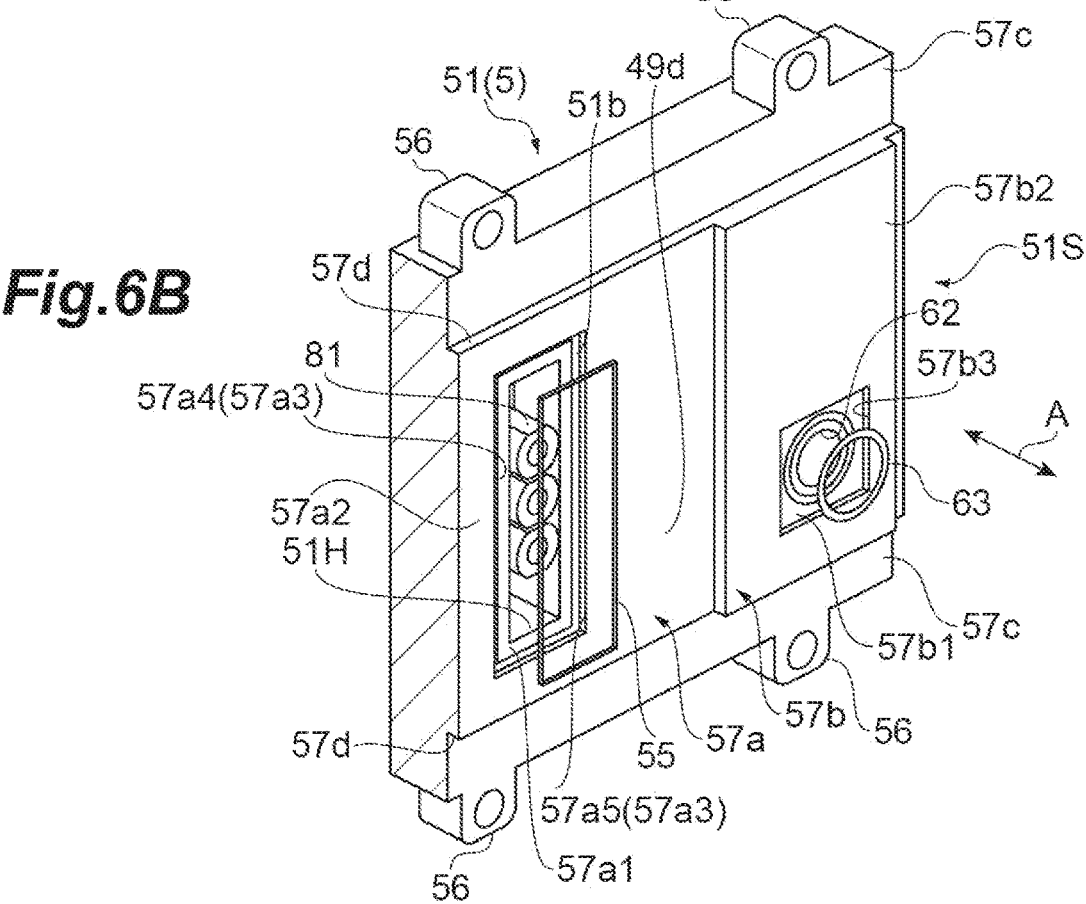

As shown in FIG. 6B, the connection surface 51S of the inverter case 51 has an inverter electric connection surface 57a, an inverter flow channel connection surface 57b, an inverter coupling surface 57c, an inverter step surface 57d (third inverter step surface), and a groove lid surface 49d.

The inverter electric connection surface 57a includes a portion that faces the motor electric connection surface 47a such that the planar shape of the inverter electric connection surface 57a is not the same as the planar shape of the motor electric connection surface 47a. The same applies to the inverter flow channel connection surface 57b and the inverter coupling surface 57c below. The inverter flow channel connection surface 57b includes a portion that faces the motor flow channel connection surface 47b. The inverter coupling surface 57c includes a portion that faces the motor coupling surface 47c.

The inverter-side connection part 81 is attached to the inverter electric connection surface 57a. For example, the inverter electric connection surface 57a has the inverter depressing surface 57a1 (first inverter depressing surface), an inverter surrounding surface 57a2 (first inverter surrounding surface), and an inverter step surface 57a3 (first inverter step surface, inverter inner wall surface).

The inverter depressing surface 57a1 faces the motor depressing surface 47a1. The inverter surrounding surface 57a2 faces the motor surrounding surface 47a2. The inverter step surface 57a3 faces the motor step surface 47a3.

The inverter depressing surface 57a1 includes an opening of the hole 51H. The inverter-side connection part 81 is disposed in the hole 51H. The inverter depressing surface 57a1 surrounds the inverter-side connection part 81. The inverter depressing surface 57a1 includes the groove 51b that holds the packing 55.

The inverter surrounding surface 57a2 surrounds the inverter depressing surface 57a1. For example, the inverter surrounding surface 57a2 may be defined as a surface different from the inverter depressing surface 57a1. The inverter surrounding surface 57a2 may be defined as including the inverter depressing surface 57a1 as a portion thereof.

The inverter depressing surface 57a1 is coupled to the inverter surrounding surface 57a2 via the inverter step surface 57a3. The inverter step surface 57a3 extends in a normal direction of the inverter surrounding surface 57a2. The inverter depressing surface 57a1 is thus parallel to the inverter surrounding surface 57a2. However, the position of the inverter surrounding surface 57a2 is different from the position of the inverter depressing surface 57a1 in the facing direction A. For example, the inverter depressing surface 57a1 is recessed in the facing direction A toward the inverter case 51 from the motor case 43.

The interface part 62 (inverter flow channel port) is formed in the inverter flow channel connection surface 57b. The interface part 62 forms the flow channel of the cooling water. The position of the inverter flow channel connection surface 57b is different from the position of the inverter electric connection surface 57a in the facing direction A. For example, the inverter electric connection surface 57a projects from the inverter flow channel connection surface 57b in the facing direction A toward the inverter case 51 from the motor case 43. Additionally, the inverter flow channel connection surface 57b has an inverter depressing surface 57b1 (second inverter depressing surface), an inverter surrounding surface 57b2 (second inverter surrounding surface), and an inverter step surface 57b3 (second inverter step surface).

The inverter depressing surface 57b1 faces the motor depressing surface 47b1. The inverter surrounding surface 57b2 faces the motor surrounding surface 47b2. The inverter step surface 57b3 faces the motor step surface 47b3.

The inverter depressing surface 57b1 includes the interface part 62 which is a through hole. The inverter depressing surface 57b1 surrounds the interface part 62. The inverter depressing surface 57b1 depresses the packing 63.

The inverter depressing surface 57b1 is coupled to the inverter surrounding surface 57b2 via the inverter step surface 57b3. The inverter step surface 57b3 extends in a normal direction of the inverter surrounding surface 57b2. The inverter depressing surface 57b1 is thus parallel to the inverter surrounding surface 57b2. However, the position of the inverter surrounding surface 57b2 is different from the position of the inverter depressing surface 57b1 in the facing direction A. For example, the inverter depressing surface 57b1 is recessed more than the inverter surrounding surface 57b2 in the facing direction A toward the inverter case 51 from the motor case 43.

The inverter coupling surface 57c includes a coupling part 56. The fastening member for fixing the inverter case 51 to the motor case 43 by cooperating with the coupling part 48 is attached to the coupling part 56. The inverter coupling surface 57c does not overlap with the inverter electric connection surface 57a. The inverter coupling surface 57c also does not overlap with the inverter flow channel connection surface 57b. The inverter case 51 includes two inverter coupling surfaces 57c. The inverter coupling surfaces 57c are formed so as to sandwich the inverter electric connection surface 57. The inverter coupling surfaces 57c are also formed so as to sandwich the inverter flow channel connection surface 57b.

The position of the inverter coupling surface 57c is different from the position of the inverter flow channel connection surface 57b in the facing direction A. For example, the inverter coupling surface 57c is recessed more than the inverter flow channel connection surface 57b in the facing direction A toward the inverter case 51 from the motor case 43. Similarly, the position of the inverter coupling surface 57c is different from the position of the inverter electric connection surface 57a in the facing direction A. For example, the inverter coupling surface 57c is recessed more than inverter electric connection surface 57a in the facing direction A toward the inverter case 51 from the motor case 43.

In some examples, the inverter coupling surface 57c is connected to the inverter flow channel connection surface 57b via the inverter step surface 57d. Similarly, the inverter coupling surface 57c is connected to the inverter electric connection surface 57a via the inverter step surface 57d. The surface coupling the inverter coupling surface 57c to the inverter electric connection surface 57a is flush with the surface coupling the inverter coupling surface 57c to the inverter flow channel connection surface 57b. However, in other examples these surfaces are not flush with each other, that is, these surfaces are not on the same surface. The inverter step surface 57d may thus be defined as coupling the inverter coupling surface 57c to at least one of the inverter electric connection surface 57a and the inverter flow channel connection surface 57b.

The alignment of the inverter case 51 relative to the motor case 43 will now be described.

When fixing the inverter case 51 to the motor case 43, a mechanical coupling is formed by the coupling parts 48, 56. Additionally, connection by the cooling water connection structure 6 and connection by the electric connection structure 7 are also made such that the connection structures of the inverter 5 are aligned with the connection structures of the electric motor 4. In some examples, the electric connection structure 7 includes the engagement of the housings. A more accurate alignment may be achieved for examples in which the inverter case 51 has a structure relative to the motor case 43 which facilitates the alignment.

An alignment structure includes two combinations. A first combination includes the motor step surface 47d on the connection surface 43S of the motor case 43 and the inverter step surface 57d on the connection surface 51S of the inverter case 51. That is, the position of the motor step surface 47d or the inverter step surface 57d in the normal direction is determined by the motor step surface 47d being pressed against the inverter step surface 57d.

Additionally, a second combination includes the motor step surface 47a3 on the connection surface 43S of the motor case 43 and the inverter step surface 57a3 on the connection surface 51S of the inverter case 51. For example, the second combination includes a pair of step side surfaces 47a4, 47a5 included in the motor step surface 47a3 and a pair of step side surfaces 57a4, 57a5 included in the inverter step surface 57a3. The step side surface 47a4 faces the step side surface 57a4. The step side surface 57a4 and the step side surface 57a5 face opposite directions. The first step side surface 47a4 of the motor case 43 contacts the first step side surface 57a4 of the inverter case 51. The second step side surface 47a5 of the motor case 43 contacts the second step side surface 57a5 of the inverter case 51. In some examples, the position in a direction in which the step side surface 47a4 faces the step side surface 47a5 or in a direction in which the step side surface 57a4 faces the step side surface 57a5 is determined.

The direction determined by the first combination is different from the direction determined by the second combination. For example, the direction determined by the first combination is orthogonal to the direction determined by the second combination. The alignment structure facilitates the inverter case 51 to be accurately aligned with the motor case 43.

In the electric turbocharger 1 described above, the relative position of the receptacle 83 is variable. As a result, the receptacle 83 is movable relative to the receptacle housing 82 according to the position of the pin 73. Thus, the allowable misalignment of the receptacle 83 relative to the pin 73 with the inverter case 51 fixed to the motor case 43 can be increased. As a result, the workability of attaching the inverter case 51 to the motor case 43 is improved to facilitate the assembly of the electric turbocharger 1. As a result, the electric turbocharger 1 is capable of having compatibility which enables different combinations of the inverter 5 and the electric motor 4.

In the electric turbocharger 1, the inverter 5 is electrically connected to the electric motor 4 by the motor-side connection part 71 and the inverter-side connection part 81. The electric turbocharger 1 includes the packings 77 sandwiched between the pin housing 72 and the pins 73. The packings 77 maintain the watertightness of the motor-side connection part 71. As a result, the movement of water through the motor-side connection part 71 is inhibited. The intrusion of water into the interior of the inverter 5 is thus suppressed.

The electric turbocharger 1 also has two other watertight structures in addition to the watertight structure above. The first watertight structure and the second watertight structure can reliably suppress the movement of gas and liquid from the electric motor 4 to the inverter 5. Moreover, the third watertight structure can reliably suppress the movement of gas and liquid from outside the electric turbocharger 1 to the interior of the inverter 5. As a result, the intrusion of gas and liquid into the interior of the inverter 5 can be reliably prevented.

It is to be understood that not all aspects, advantages and features described herein may necessarily be achieved by, or included in, any one particular example. Indeed, having described and illustrated various examples herein, it should be apparent that other examples may be modified in arrangement and detail. For example, the inverter integrated gas supply device can be implemented in various ways other than the examples described above. One or more of the examples described above may be applied to an electric turbocharger without a turbine.

In some examples, the motor-side connection part 71 has the pins 73 and the inverter-side connection part 81 has the receptacles 83. However, the motor-side connection part 71 may have receptacles and the inverter-side connection part 81 may have pins.

In some examples, the motor electric connection surface 47a projects more than the motor flow channel connection surface 47b and no circulation of liquid occurs between the motor electric connection surface 47a and the motor flow channel connection surface 47b. Additionally, the motor electric connection surface 47a and the motor flow channel connection surface 47b are not the same surface. For example, the motor flow channel connection surface 47b may be projected more than the motor electric connection surface 47a. Alternatively, the motor electric connection surface 47a and the motor flow channel connection surface 47b may have the same height from a reference plane with a groove between the motor electric connection surface 47a and the motor flow channel connection surface 47b. This groove may be, for example, the drain groove 49.

The invention claimed is:

1. An inverter integrated gas supply device comprising:
a fluid machine configured to discharge air;
an electric motor having a motor casing and configured to drive the fluid machine;
an inverter having an inverter casing and configured to supply a drive current to the electric motor;
a motor-side connection part attached to the motor casing and configured to receive the drive current; and
an inverter-side connection part attached to the inverter casing, connected to the motor-side connection part, and configured to supply the drive current to the motor-side connection part,
wherein the motor-side connection part includes a motor-side connector housing attached to the motor casing, and a motor connector disposed inside the motor-side connector housing and configured to receive the drive current from the inverter-side connection part; and
the inverter-side connection part includes:
a socket having a first end surface that is pressed against the inverter casing,
a fastening member that is inserted through the socket and pressed against a second end surface of the socket,
an inverter-side connector housing attached to the inverter casing and including a through hole through which the socket and the fastening member are inserted, such that a gap is formed between a circumferential surface of the socket and the through hole, and
an inverter connector disposed inside the inverter-side connector housing and configured to supply the drive current to the motor connector.

2. The inverter integrated gas supply device according to claim 1, wherein the inverter-side connector housing includes a body and a flange forming the through hole;
the inverter casing includes a fastening hole mating with the fastening member to couple the flange of the inverter-side connector housing with the inverter casing;
the motor connector includes a pin that is in a fixed position relative to the motor-side connector housing;
the inverter connector includes a receptacle located inside the body of the inverter-side connector housing, that is configured to receive the pin; and
the gap formed between the socket and the through hole causes the flange of the inverter-side connector housing to be movable relative to the inverter casing, to align the receptacle of the inverter connector with the pin of the motor connector.

3. The inverter integrated gas supply device according to claim 2, wherein the socket forms a disk-shaped flange extending between the fastening member and the flange of the inverter-side connector housing; and
another gap is formed between the disk-shaped flange of the socket and the flange of the inverter-side connector housing.

4. The inverter integrated gas supply device according to claim 1,
wherein the motor casing includes a motor main surface facing an inverter main surface of the inverter casing;
the motor-side connection part is formed on the motor main surface and is electrically connected to inverter-side connection part that is formed on the inverter main surface;
the motor main surface forms a motor flow channel port configured to direct a flow of cooling water; and
the inverter main surface form an inverter flow channel port that communicates with the motor flow channel port.

5. An inverter integrated gas supply device comprising:
a fluid machine configured to discharge air;
an electric motor having a motor casing and configured to drive the fluid machine;
an inverter having an inverter casing and configured to supply a drive current to the electric motor;
a motor-side connection part attached to the motor casing and configured to receive the drive current; and
an inverter-side connection part attached to the inverter casing, connected to the motor-side connection part, and configured to supply the drive current to the motor-side connection Part,
wherein the motor-side connection part includes a motor-side connector housing attached to the motor casing, and a motor connector disposed inside the motor-side connector housing and configured to receive the drive current from the inverter-side connection part;
the inverter-side connection part includes an inverter-side connector housing attached to the inverter casing, and an inverter connector disposed inside the inverter-side connector housing and configured to supply the drive current to the motor connector;
a motor main surface of the motor casing includes a motor electric connection surface to which the motor-side connection part is attached, and a motor flow channel connection surface having a motor flow channel port configured to form a flow channel of cooling water;
an inverter main surface of the inverter casing includes an inverter electric connection surface to which the inverter-side connection part is attached, the inverter electric connection surface configured to face the motor electric connection surface in a facing direction, and an inverter flow channel connection surface having an inverter flow channel port configured to be coupled to the motor flow channel port and configured to face the motor flow channel connection surface in the facing direction;

the motor electric connection surface differs in position from the motor flow channel connection surface in the facing direction; and the inverter electric connection surface differs in position from the inverter flow channel connection surface in the facing direction.

6. The inverter integrated gas supply device according to claim 5, wherein the motor electric connection surface includes a first motor depressing surface that presses against a first sealing member disposed so as to surround the motor-side connection part, a first motor surrounding surface that surrounds the first motor depressing surface, and a first motor step surface connecting the first motor depressing surface to the first motor surrounding surface; and the inverter electric connection surface includes a first inverter depressing surface that presses against the first sealing member, a first inverter surrounding surface that surrounds the first inverter depressing surface, and a first inverter step surface connecting the first inverter depressing surface to the first inverter surrounding surface.

7. The inverter integrated gas supply device according to claim 6, wherein the motor main surface further includes a motor coupling surface having a coupling part that couples the motor casing to the inverter casing, and a third motor step surface that couples the motor coupling surface to at least one of the motor electric connection surface and the motor flow channel connection surface;

the inverter main surface further includes an inverter coupling surface facing the motor coupling surface, and a third inverter step surface that couples the inverter coupling surface to at least one of the inverter electric connection surface and the inverter flow channel connection surface;

the first motor step surface abuts the first inverter step surface;

the third motor step surface abuts the third inverter step surface; and the first motor step surface faces a direction different from a direction in which the third motor step surface faces.

8. The inverter integrated gas supply device according to claim 5, wherein the motor flow channel connection surface includes a second motor depressing surface that presses against a second sealing member disposed so as to surround the motor flow channel port, a second motor surrounding surface that surrounds the second motor depressing surface, and a second motor step surface connecting the second motor depressing surface to the second motor surrounding surface; and the inverter flow channel connection surface includes a second inverter depressing surface that presses against the second sealing member, a second inverter surrounding surface that surrounds the second inverter depressing surface, and a second inverter step surface connecting the second inverter depressing surface to the second inverter surrounding surface.

9. The inverter integrated gas supply device according to claim 5, wherein a groove is formed in at least one of the motor main surface and the inverter main surface;

the groove formed in the motor main surface is formed between the motor electric connection surface and the motor flow channel connection surface; and the groove formed in the inverter main surface is formed between the inverter electric connection surface and the inverter flow channel connection surface.

10. The inverter integrated gas supply device according to claim 5, wherein the inverter-side connection part further includes a socket and a fastening member;

the inverter-side connector housing includes a through hole through which the socket and the fastening member are inserted;

the fastening member is inserted through the socket;

the fastening member is pressed against one end surface of the socket;

another end surface of the socket is pressed against the inverter casing; and a gap is formed between a circumferential surface of the socket and the through hole.

11. The inverter integrated gas supply device according to claim 5, wherein the inverter-side connector housing includes a body and a flange forming a through hole;

the inverter-side connection part further includes a socket extending through the through hole and a fastening member that is inserted through the socket;

the inverter casing includes a fastening hole mating with the fastening member to couple the flange of the inverter-side connector housing with the inverter casing; and a gap is formed between the socket and the through hole to cause the inverter-side connector housing to be movable relative to the inverter casing, to align the inverter connector with the motor connector.

12. An inverter integrated gas supply device comprising:
a fluid machine configured to discharge air;
an electric motor having a motor casing and configured to drive the fluid machine; and
an inverter having an inverter casing and configured to supply a drive current to the electric motor;
wherein the motor casing includes a motor main surface configured to face the inverter;
the inverter casing includes an inverter main surface configured to face the motor main surface;
the motor main surface has a motor flow channel port and a motor-side connection part; and
the inverter main surface has an inverter flow channel port configured to communicate with the motor flow channel port, and an inverter-side connection part electrically connected to the motor-side connection part.

13. The inverter integrated gas supply device according to claim 12, wherein the motor main surface includes a pair of motor step surfaces formed so as to sandwich the motor flow channel port and the motor-side connection part;

the inverter main surface includes a pair of inverter step surfaces formed so as to sandwich the inverter flow channel port and the inverter-side connection part; and one of the pair of motor step surfaces contacts one of the pair of inverter step surfaces.

14. The inverter integrated gas supply device according to claim 13, wherein the motor main surface includes a motor electric connection surface having the motor-side connection part, a motor flow channel connection surface having the motor flow channel port and a pair of motor coupling surfaces formed so as to sandwich the motor electric connection surface, and the motor flow channel connection surface, and the motor electric connection surface and the motor flow channel connection surface are recessed from the motor coupling surfaces.

15. The inverter integrated gas supply device according to claim 13, wherein the motor main surface includes a motor electric connection surface having the motor-side connection part;

the inverter main surface includes an inverter electric connection surface having the inverter-side connection part and facing the motor electric connection surface; and a direction in which the motor step surfaces and the inverter step surfaces face each other intersects a direction in which the motor electric connection surface and the inverter electric connection surface face each other.

16. The inverter integrated gas supply device according to claim 15, wherein the motor electric connection surface includes a motor surrounding surface that surrounds the motor-side connection part and that faces the inverter electric connection surface, and a motor standing surface extending from the motor surrounding surface toward the inverter electric connection surface;

the inverter electric connection surface includes an inverter surrounding surface that surrounds the inverter-side connection part and that faces the motor electric connection surface, and an inverter inner wall surface extending from the inverter surrounding surface and away from the motor electric connection surface;

the motor standing surface contacts the inverter inner wall surface;

a direction in which the motor standing surface and the inverter inner wall surface face each other intersects the direction in which the motor step surfaces and the inverter step surfaces face each other; and the direction in which the motor standing surface and the inverter inner wall surface face each other additionally intersects the direction in which the motor electric connection surface and the inverter electric connection surface face each other.

17. The inverter integrated gas supply device according to claim 12, wherein the motor main surface includes a motor flow channel connection surface having the motor flow channel port;

the inverter main surface includes an inverter flow channel connection surface having the inverter flow channel port and facing the motor flow channel connection surface;

a first surface selected from the motor main surface and the inverter main surface includes a groove bottom surface recessed from the motor flow channel connection surface or the inverter flow channel connection surface;

a second surface selected from the motor main surface and the inverter main surface includes a groove lid surface that faces the groove bottom surface, and a distance from the groove bottom surface to the groove lid surface is greater than a distance from the motor flow channel connection surface to the inverter flow channel connection surface.

18. The inverter integrated gas supply device according to claim 17, wherein the motor main surface further includes a motor electric connection surface having the motor-side connection part, and a pair of motor coupling surfaces formed so as to sandwich the motor electric connection surface and the motor flow channel connection surface, such that at least one of the motor coupling surfaces is divided by the groove bottom surface;

the inverter main surface includes an inverter electric connection surface having the inverter-side connection part and facing the motor electric connection surface;

the groove bottom surface is formed on the motor main surface and is recessed from the motor coupling surfaces;

the groove lid surface is formed on the inverter main surface; and the distance from the groove bottom surface to the groove lid surface is greater than a distance from the motor electric connection surface to the inverter electric connection surface.

19. The inverter integrated gas supply device according to claim 17, wherein the motor main surface includes the motor flow channel connection surface having the motor flow channel port, and a motor electric connection surface having the motor-side connection part; and the motor flow channel connection surface and the motor electric connection surface differ in position along a normal direction of the motor main surface.

20. The inverter integrated gas supply device according to claim 19, wherein the motor main surface further includes a groove bottom surface formed between the motor flow channel connection surface and the motor electric connection surface, and recessed from the motor flow channel connection surface and the motor electric connection surface; and a height from the groove bottom surface to the motor electric connection surface is greater than a height from the groove bottom surface to the motor flow channel connection surface.

* * * * *